(12) United States Patent
Jacobs

(10) Patent No.: US 8,601,841 B1
(45) Date of Patent: Dec. 10, 2013

(54) HOOD AND WHEEL BRACE

(76) Inventor: Royce Jacobs, Bronx, NY (US)

( * ) Notice: Subject to any disclaimer, the term of this patent is extended or adjusted under 35 U.S.C. 154(b) by 0 days.

(21) Appl. No.: 13/440,229

(22) Filed: Apr. 5, 2012

Related U.S. Application Data

(60) Provisional application No. 61/516,627, filed on Apr. 5, 2011.

(51) Int. Cl.
*E05B 65/12* (2006.01)

(52) U.S. Cl.
USPC .................................. 70/237; 70/233; 70/240

(58) Field of Classification Search
USPC .................. 70/14, 62, 233–236, 237, 240
See application file for complete search history.

(56) References Cited

U.S. PATENT DOCUMENTS

| | | | | |
|---|---|---|---|---|
| 2,885,090 A * | 5/1959 | Forman et al. | ................. | 211/175 |
| 4,312,452 A * | 1/1982 | Waier | ............................. | 211/175 |
| 4,437,697 A * | 3/1984 | Hinojos | ........................ | 293/118 |
| 4,649,724 A * | 3/1987 | Raine | ............................... | 70/226 |
| 5,052,199 A * | 10/1991 | Derman | ............................ | 70/58 |
| 5,314,040 A * | 5/1994 | Rivera | ............................. | 70/237 |
| 5,638,710 A * | 6/1997 | Howard et al. | ................. | 70/259 |
| 5,724,839 A * | 3/1998 | Thering | ............................. | 70/18 |
| 6,349,573 B1 * | 2/2002 | Johnson | ............................ | 70/14 |
| 6,434,980 B1 * | 8/2002 | Foster | .............................. | 70/19 |
| 7,107,802 B2 * | 9/2006 | Clarke | ............................ | 70/226 |

* cited by examiner

*Primary Examiner* — Christopher Boswell
(74) *Attorney, Agent, or Firm* — Carol N. Green, Esq.

(57) ABSTRACT

A hood and wheel brace comprising of a horizontal bar, encased in a plastic sleeve, being hollow and having two ends, with extendable bars slideably mounted and extending from each end of the horizontal bar operationally adjustable for sizing of a vehicle's hood and wherein each extendable bar is received in an insertion hole defined in one end of a retractable tower to align with the insertion hole and locked within the retractable tower; said retractable towers each having two ends, with a hook extending downward at one end inclined to allow the hook to embrace an inner side of the vehicle's front wheel; and a vertical shaft which includes a plurality of ratchet teeth longitudinally extending over a portion thereof, configured to allow the vertical shaft to slideably extend the sizing of the retractable tower.

18 Claims, 4 Drawing Sheets

HOOD AND WHEEL BRACE

PRIORITY CLAIM

The present application claims priority to, and is a Continuation in Part of U.S. Provisional Patent Application Ser. No. 61/516,627 titled: "A Hood And Wheel Brace Device," filed Apr. 5, 2011. The entire disclosure of said Provisional Patent Application is incorporated herein by reference as if fully stated herein.

FIELD OF THE INVENTION

The present invention relates to a hood and wheel brace meant to provide additional security for protecting automotive engine components beneath a vehicle's hood.

BACKGROUND OF THE INVENTION

Many high performance engines include specialized parts that are expensive to produce and to maintain. Persons with knowledge of cars can readily identify engines that have been enhanced with after market engine components to increase their performance. Although all car enthusiasts would enjoy having their engines running at peak or at a minimum high performance, some simply cannot afford the engine components to accomplish this dream and do not mind paying a reduced rate for "hot" or stolen parts. As such, the theft rate for high performance engine components is quite high and to date the prior art has yet to find a way to successfully deter or eliminate this problem.

Audible alarms are quite popular as a theft deterrent but over the years thieves have been able to quickly silence alarms, open the hood, remove and/or strip the engine in record time. Thus there needs to be a practical solution to protect engine components beneath the vehicle hood in a new and novel manner that does not damage the vehicle's exterior yet effective as a deterrent.

Accordingly, the various embodiments and disclosures described herein satisfies these long felt needs and solves the limitations of the prior art in a new and novel manner.

SUMMARY OF THE INVENTION

An objective of the hood and wheel brace is to deter theft of engine components beneath the hood along with immobilization of the vehicle.

Another objective of the hood and wheel brace is to engage the hood and wheels in a unique and novel manner such that the hood remains closed as well as restraining the front wheels such that the vehicle is immobilized until it is released by the owner.

Another objective of the hood and wheel brace is to provide a device for deterring theft of automotive engine components wherein the hood and brace includes a horizontal bar constructed from high-strength materials, e.g. metals such as steel and the like, thus deterring cutting with pliers, hammered or freeze attacks. The horizontal bar includes extendable bars, which may be adjusted laterally allowing the hood and wheel brace to de dimensioned in size to suit the various sizes of different vehicles. In some embodiments, the hood and wheel brace may be painted in bright colors, providing for a visual alert where a disassembled brace can be readily seen if a thief is struggling to displace the hood and wheel brace or attempting to drive the vehicle while the hood and wheel brace is still engaged on the vehicle.

The hood and wheel brace includes a horizontal bar comprising of extendable bars that extend in some embodiments mid-way across the hood of a vehicle. In some embodiments, the extendable bars are solid, comprising of one solid piece constructed form high-strength materials, e.g. metals such as steel and the like. The extendable bars have the capacity to retract and expand by contracting or expanding inward and outward of the horizontal bar.

The hood and wheel brace includes vertical towers that are also constructed of high-strength materials, e.g. metals such as steel and the like. The towers are adjustable to accommodate for the differing heights of hoods relative to the wheels. In some embodiments, the towers slidably move between the wheel's spokes to anchor themselves whereby the tower hooks secure the wheels immobilizing the vehicle.

In some embodiments, the hood and wheel brace includes a locking means positioned on the distal end of the horizontal bar and/or the extendable bars. In some embodiments, the locking means includes a key lock while in others the locking means is secured by a combination locking means.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

The features and advantages of embodiments of the present invention will become more apparent from the detailed description set forth below when taken in conjunction with the claims and drawing(s), in which like reference numbers indicate identical or functionally similar elements or steps. Additionally, the leftmost digit of a reference number identifies the drawing in which the reference number first appears.

DETAILED DESCRIPTION OF THE DRAWINGS

Figure 1:
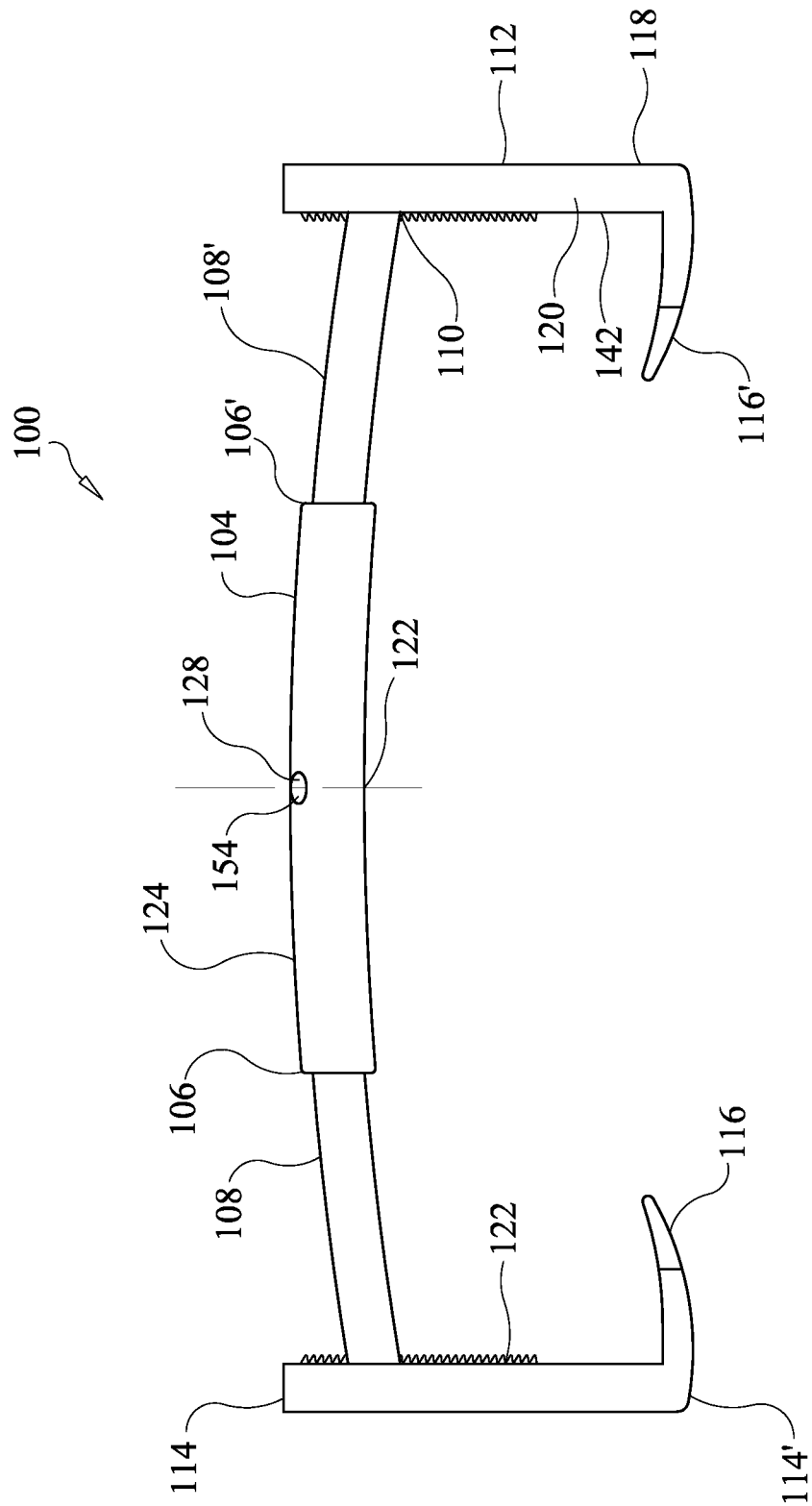
FIG. 1 illustrates the hood and wheel brace according to an embodiment of the present invention.

The following discussion describes in detail an embodiment of the apparatus 100, i.e. the hood and wheel brace 100. However, this discussion should not be construed, as limiting the invention to those particular embodiments, as practitioners skilled in the art will appreciate that the hood and wheel brace 100 may vary as to configuration and details of the various elements, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

FIG. 1 illustrates the hood and wheel brace 100 according to an embodiment of the present invention. The hood and wheel brace 100 comprises of a horizontal bar 102, encased in a plastic sleeve 104, being hollow and having two ends 106, 106', with extendable bars 108, 108' slideably mounted and extending from each end 106 of the horizontal bar 102 operationally adjustable for sizing of a vehicle's hood and wherein each extendable bar 108 is received in an insertion hole 110 defined in one end of a vertical retractable tower 112 to align with the insertion hole 110 and locked within the retractable tower 112; and the retractable towers 112, 112' each having two ends 114, 114', with a hook 116 extending downward at one end 114 inclined to allow the hook 116 to embrace an inner side of the vehicle's front wheel's spokes; and vertical shaft 118 positioned on the retractable tower 112 with a plurality of ratchet teeth 120 longitudinally extending over a portion 122 thereof, configured to allow the vertical shaft 118 to slideably extend the sizing of the vertical retractable tower 112.

Figure 2A:
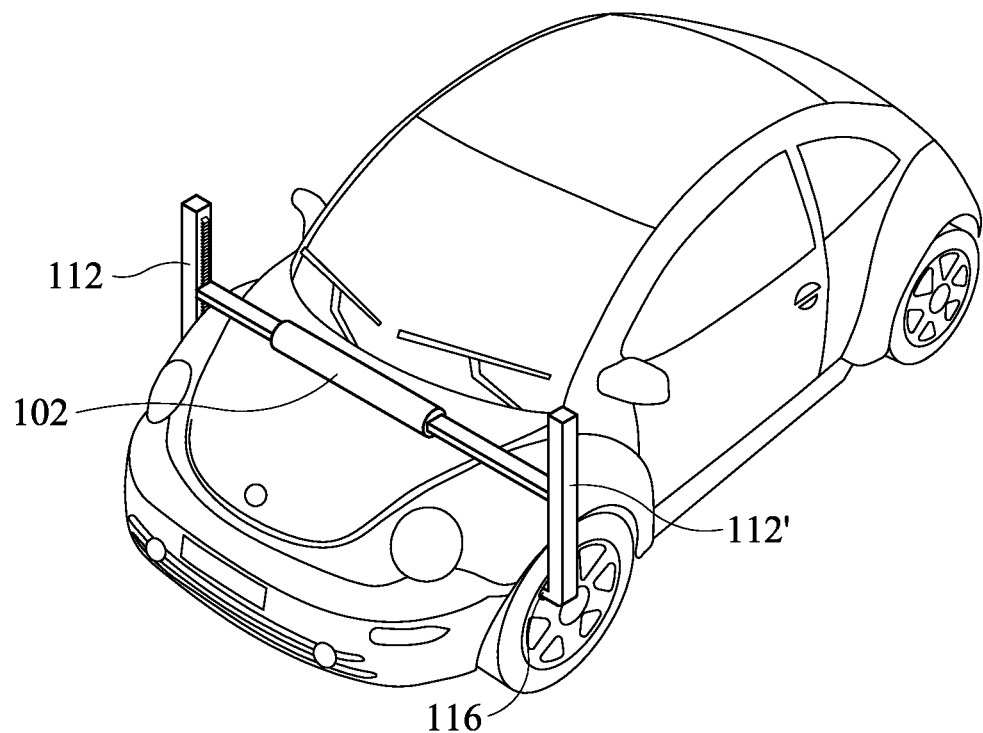
FIGS. 2A-2C illustrate the hood and wheel brace in use according to an embodiment of the present invention.
Figures 2B, 2C:
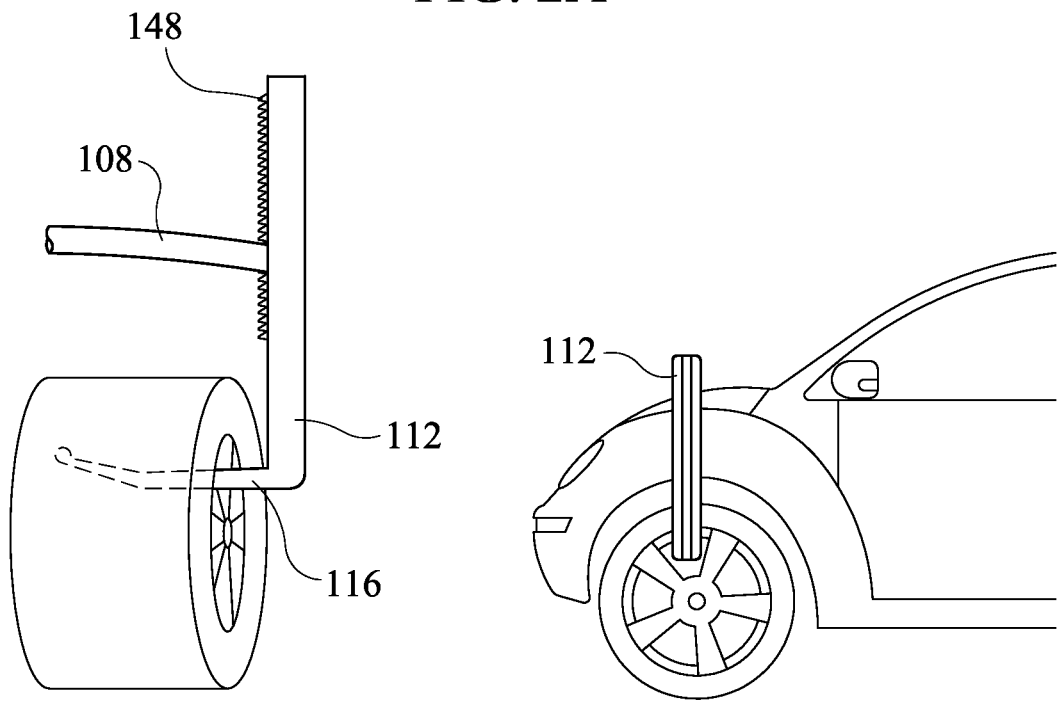

The horizontal bar 102, which is ever so slightly bent, allows the positioning of the hood and wheel brace 102 to be detachably secured on a vehicle's hood without sliding off when mounted as shown in FIGS. 2A-2C. Horizontal bar 102 is dimensioned in size to fit the hoods of various types of vehicles, e.g. small compact vehicles, medium sized vehicles, large and extra large vehicles, e.g. vans, cars, sports utility vehicles, trucks, campers, and the like. Moreover, the hood and wheel brace 100 is configured such that when the horizontal bar 102 and the extendable bars 108, 108' are engaged within the towers 112, 112' and the hooks 116, 116' extending therefrom are detachably mounted on two opposite sides of the vehicle within the spokes of a vehicle's front wheels, the hood and wheel brace 100 provide an excellent theft deterrent. The horizontal bar 102, which harnesses the extendable bars 108, 108' is constructed from high-strength materials, e.g. metals such as steel and the like and is covered with a durable plastic sleeve 104 providing a protective layer such that no scratches or abrasions will occur when the hood and wheel brace 100 is mounted on the vehicle's hood.

In some embodiments, the hood and wheel brace 100 is easily transportable as the component parts, e.g. the horizontal bar 102, extendable bars 108, 108' and the towers 112, 112' are removably attached to each other such that the brace 100 is capable of ready assembly or disassembly with ease as the extendable bars 108, 108' can be partially or wholly retracted into the horizontal bar 102. Similarly, the towers 112, 112' may be partially or wholly detached from the horizontal bar 102 and or the extendable bars 108, 108'.

In some embodiments, the hood and wheel brace 100 can be contracted in size as some of the component parts are collapsible. For example, the towers 112, 112' may be fixedly attached to the extendable bars 108, 108'. However because the extendable bars 108, to 108' may be partially or wholly retracted into the horizontal, bar 102, the hood and wheel brace 100 is collapsible in part to be dimensioned smaller in size than when mounted on a vehicle's hood for ease of transport.

The horizontal bar 102 is comprised of an elongated rod 124 of substantially circular cross-section 126. The outer diameter 128 of the rod 124 is dimensioned slightly greater than the diameter 128' of the extendable bars 108, 108' to enable the extendable bars 108, 108' to slidably move unhindered within the horizontal bar 102 whenever an extension in length is desirable. In some embodiments, the extendable bars 108, 108' comprise of a plurality of concentric collapsible portions 129, 129' such that each concentric portion 129 is of a substantially circular cross-section 126' and are dimensioned slightly greater than concentric portion 129 within.

Figure 3:
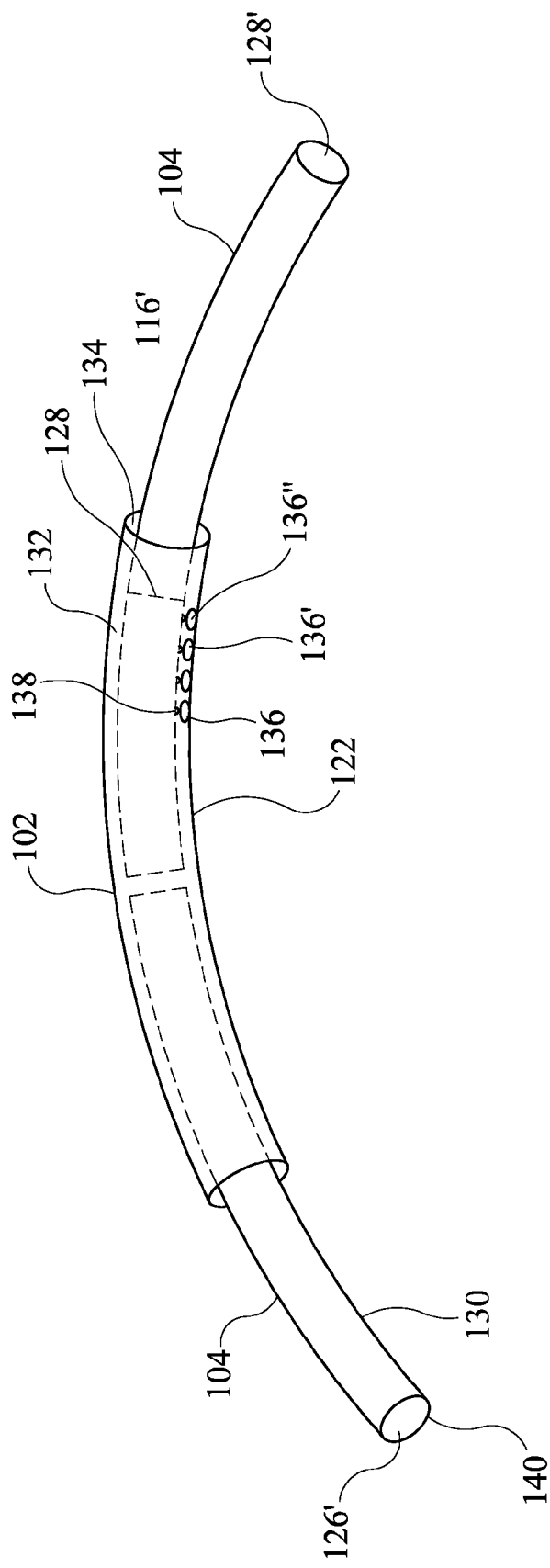
FIG. 3 illustrates the extendable bars of the hood and wheel brace according to an embodiment of the present invention.

FIG. 3 illustrates the extendable bars 104, 104' of the hood and wheel brace 100 according to an embodiment of the present invention. In some embodiments, the extendable bars 104, 104' are solid therethru or hollow but nonetheless are constructed from high-strength materials such as steel. In some embodiments, the horizontal bar 102 is detachably coupled to the extendable bars 104, 104', wherein each extendable bar 104 comprises of a hollow elongated tube 130 of circular cross-section 126' and defines a central passage 132 that is surrounded by the horizontal bar 102. A portion 122 of the horizontal bar 102 at or near an outer end 134 includes a plurality of aligned apertures 136, 136' 136" in an axially spaced longitudinal series along the horizontal bar 102 causing the extendable bars 104, 104' to lock into position when any one of the corresponding collapsible plugs 138, 138' are fitted and closed into one of the apertures 136, 136' 136" at the desired length extension. The plugs 138', 138" are similarly situated in an axially spaced longitudinal series along the extendable bars 104, 104' and may be constructed from rubber material or semi-rigid plastic for a firm fit within the apertures 132, 132' when the extendable bars 14, 104' are fully extended to the desired length. The plugs 138, 138' and corresponding apertures 136, 136' 136" are positioned on the underside 140 of the hood and wheel brace 100 such that they are inaccessible for tampering once the hood and wheel brace 100 is mounted on the vehicle's hood.

Figure 4A:
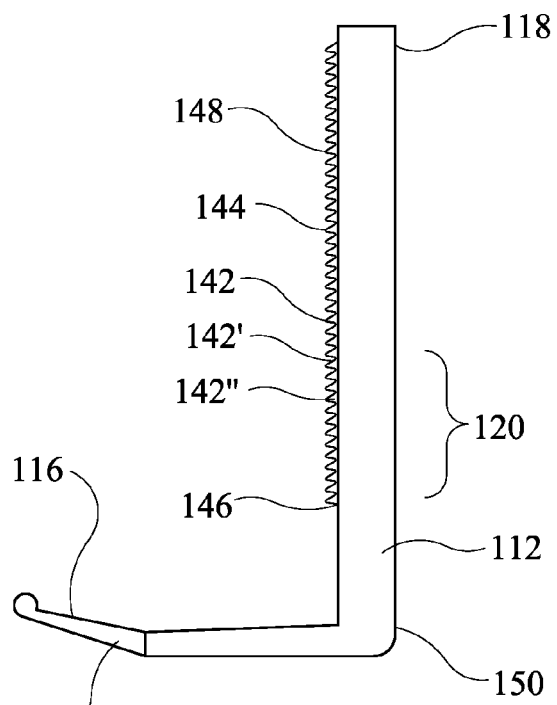
FIGS. 4A-4C illustrate a vertical retractable tower of the hood and wheel brace according to an embodiment of the present invention.
Figure 4B:
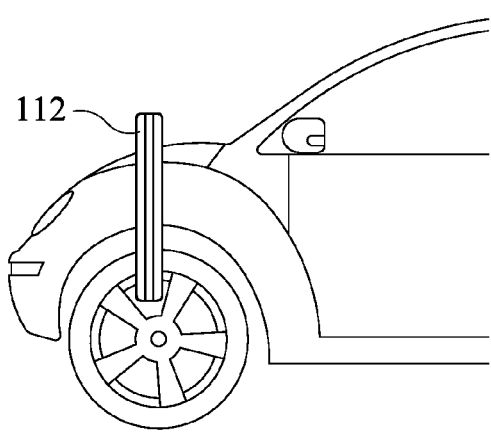
Figure 4C:
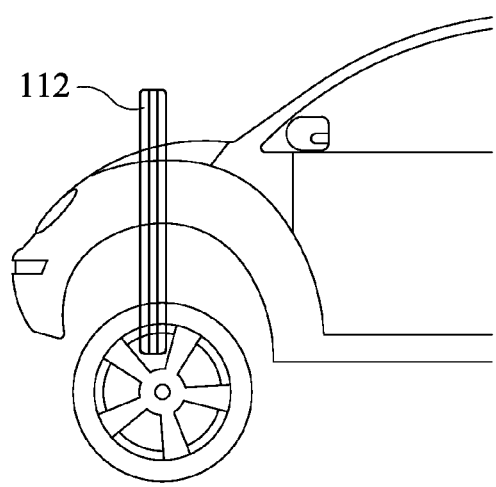

FIGS. 4A-4C illustrate a vertical retractable tower 112 of the hood and wheel brace 100 according to an embodiment of the present invention. Each tower 112 includes an insertion hole 110 for receiving the distal end 140 of the elongated tube 130 of the extendable bar 104. The distal end 140 of the extendable bar 104 is dimensioned slightly less than the diameter of the tower's insertion hole 110 to enable the extendable bar 104 to be in mating engagement with the insertion hole 110 and securely lock into position within the retractable tower 112.

As shown in FIGS. 4B & 4C, the retractable tower 112 is adjustable to accommodate the various heights of different vehicle hoods relative to their wheel sizes. In some embodiments, the tower's hook 116 may be slidably inserted within the front wheel's spokes to anchor themselves securing the vehicle's front wheels preventing them from spinning and effectively immobilizes the vehicle.

In some embodiment, the vertical retractable tower 112 comprises of a vertical shaft 118 and includes a plurality of ratchet teeth 120 longitudinally extending over a portion 122 thereof, configured to allow the vertical shaft 118 to slideably extend longitudinally, either upward or downward, the sizing of the retractable tower 112. In some embodiments the ratchet teeth 120 each comprise of a protruding member 142 outwardly extending in an axial direction away from the vertical shaft 118 which is in mating engagement with a stop surface 144 along the vertical shaft 118 extending perpendicularly to the protruding member 142 to stop the vertical shaft 118 at the desired length for the vertical tower 112 when mounted. The vertical shaft 118 and the ratchet teeth 120 are preferably constructed from case hardened steel.

In some embodiments the ratchet teeth 120 each comprise of a conical surface 146 extending radially outwardly in an axial direction away from the vertical shaft 118, and an annular stop surface 148 extending perpendicularly to the axis A.

The retractable tower 112 has a generally L-shaped member 150 that is rigidly secured to the vertical shaft 118 of the retractable tower 112 extending from one end 114 to form a hook 116 opening in the axial direction away from the vertical shaft 118 of the vertical tower 112 for engagement within a spoke of a vehicle's wheel rims. In some embodiments a durable plastic coating or cover 152 is provided over the hook 118 to protect the wheels rims from abrasions.

In some embodiments, the hood and wheel brace 100 includes locking means 154 further comprising of a key lock cylinder or combination locking means as are generally known and used in the arts. The locking means 154 may be positioned on upper portion 122 of the horizontal bar 102 and/or the extendable bars 104, 104' for ease of access and handling.

The invention has been described in detail with particular reference to certain preferred embodiments thereof, but it will be understood that variations and modifications can be effected within the spirit and scope of the invention.

While the invention has been described in connection with specific embodiments and applications, the inventor does not intend to restrict the description to the examples shown. Persons skilled in the art will recognize that the above hood and wheel brace 100 may be modified or changed without departing from the general scope of the present description, the intention of the inventor being to include all such modifications and alterations in so far as they come within the scope of the appended claims or the equivalents thereof. It will be understood that each of the elements described above, or two or more together may also find a useful application in other types of hood and wheel brace 100 differing from the type described above.

While certain novel features of this invention have been shown and described and are pointed out in the annexed claims, it is not intended to be limited to the details above, since it will be understood that various omissions, modifications, substitutions and changes in the hood and wheel brace 100 illustrated and in its operation can be made by those skilled in the art without departing in any way from the spirit of the present invention.

What is claimed is:

1. A hood and wheel brace comprising of:
   (a) a horizontal bar, encased in a plastic sleeve, being hollow and having two ends, with extendable bars slideably mounted and extending from each end of the horizontal bar operationally adjustable for sizing of a vehicle's hood and wherein each extendable bar is received in an insertion hole defined in one end of a vertical retractable tower to align with the insertion hole and locked within the retractable tower;
   (b) said vertical retractable towers each having two ends, an upper and a lower end, with a hook extending downward at the lower end, inclined to allow the hook to slideably move through a rim of a vehicle's front wheel and anchor itself in the vehicle's wheel well; and
   (c) a vertical shaft, which includes a plurality of ratchet teeth longitudinally extending over a portion thereof, configured to allow the vertical shaft to slideably extend the sizing of the vertical retractable tower.

2. The hood and wheel brace of claim 1, further comprising of locking means which includes any one of the following: key mechanism or combination lock.

3. The locking means of claim 2, wherein the locking means is positioned on the horizontal bar or the extendable bars.

4. The hood and wheel brace of claim 1, wherein the hooks include a generally L-shaped member extending horizontally from the distal end of the tower.

5. The hood and wheel brace of claim 1, wherein the hood and wheel brace is dimensioned in size to fit the hoods of various types of vehicles.

6. The hood and wheel brace of claim 1, wherein the horizontal bar, extendable bars and the vertical retractable towers are removably attached to each other.

7. The hood and wheel brace of claim 1, wherein the extendable bars can be partially or wholly retracted into the horizontal bar.

8. The hood and wheel brace of claim 1, wherein the vertical retractable towers may be partially or wholly detached from the horizontal bar or the extendable bars.

9. The hood and wheel brace of claim 1, wherein the vertical retractable towers may be fixedly attached to the extendable bars that may be partially or wholly retracted into the horizontal bar.

10. The hood and wheel brace of claim 1, wherein the horizontal bar comprises of an elongated rod with an outer diameter dimensioned slightly greater than the diameter of the extendable bars.

11. The hood and wheel brace of claim 1, wherein a portion of the horizontal bar includes a plurality of aligned apertures in an axially spaced longitudinal series along the horizontal bar causing the extendable bars to lock into position when any one of corresponding collapsible plugs are fitted and closed into one of the apertures.

12. The hood and wheel brace of claim 11, wherein the plugs are situated in an axially spaced longitudinal series along the extendable bars.

13. The hood and wheel brace of claim 11, wherein the plugs are constructed from rubber material or semi-rigid plastic.

14. The hood and wheel brace of claim 11, wherein the plugs and the corresponding apertures are positioned on the underside of the hood and wheel brace.

15. The hood and wheel brace of claim 1, wherein distal end of the extendable bar is dimensioned slightly less than the diameter of the towers insertion hole.

16. The hood and wheel brace of claim 1, wherein the ratchet teeth each comprise of a protruding member outwardly extending in an axial direction away from the vertical shaft.

17. The hood and wheel brace of claim 1, wherein the ratchet teeth each comprise of a conical surface extending radially outwardly in an axial direction away from the vertical shaft, and an annular stop surface extending perpendicularly to the axis A.

18. The hood and wheel brace of claim 1, wherein the vertical retractable tower has a generally L-shaped member that is rigidly secured to the vertical shaft of the vertical retractable tower to form a hook opening in the axial direction away from the vertical shaft of the vertical retractable tower for engagement within a spoke of a vehicle's wheel rims.

* * * * *